(12) United States Patent
Hu

(10) Patent No.: US 8,826,764 B2
(45) Date of Patent: Sep. 9, 2014

(54) BRAKING DEVICE FOR ROTATING SHAFT AND GEAR MOTOR SYSTEM USING THE SAME

(75) Inventor: Hui Hu, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 0 days.

(21) Appl. No.: 13/402,862

(22) Filed: Feb. 22, 2012

(65) Prior Publication Data
US 2012/0152047 A1  Jun. 21, 2012

Related U.S. Application Data

(63) Continuation of application No. PCT/CN2010/076346, filed on Aug. 25, 2010.

(30) Foreign Application Priority Data

Sep. 1, 2009 (CN) .................. 2009 2 0193959 U

(51) Int. Cl.
*F16H 1/16* (2006.01)
*H02K 7/116* (2006.01)
*H02K 7/102* (2006.01)

(52) U.S. Cl.
CPC ............. *H02K 7/1166* (2013.01); *H02K 7/102* (2013.01)
USPC ................................ 74/425; 74/411

(58) Field of Classification Search
USPC ........................... 74/411.5, 425, 188
See application file for complete search history.

(56) References Cited

U.S. PATENT DOCUMENTS

| | | | | | |
|---|---|---|---|---|---|
| 4,149,430 | A | * | 4/1979 | F'Geppert ................... | 74/89.39 |
| 4,192,410 | A | * | 3/1980 | Poirier ......................... | 192/218 |
| 4,457,967 | A | * | 7/1984 | Chareire et al. ............. | 428/212 |
| 4,811,619 | A | * | 3/1989 | Cutburth ..................... | 74/89.39 |
| 5,893,439 | A | * | 4/1999 | Park .......................... | 192/219.5 |
| 5,907,972 | A | * | 6/1999 | Del Sole ..................... | 74/411.5 |
| 6,988,582 | B2 | * | 1/2006 | Kitami et al. ................ | 180/444 |
| 2005/0000308 | A1 | * | 1/2005 | Siraky et al. ................ | 74/424.6 |
| 2005/0092116 | A1 | * | 5/2005 | Pachov ....................... | 74/411.5 |

* cited by examiner

*Primary Examiner* — Troy Chambers
*Assistant Examiner* — Zakaria Elahmadi
(74) *Attorney, Agent, or Firm* — Matthias Scholl P.C.; Matthias Scholl

(57) ABSTRACT

A braking device for a rotating shaft and a gear motor system using the same. The braking device includes a brake subassembly, a rotating shaft, and a sleeve. The rotating shaft is sheathed with the sleeve. The brake subassembly includes an adjustable screw, a spring, and a brake disc. One end of the spring presses on top of the brake disc and the other end presses at the bottom of the adjustable screw. After the adjustable screw is fixed, the bottom surface of the brake disc is tightly against the outer surface of the sleeve. When the adjustable screw is adjusted, the amount of compression of the spring is changed and the pressure imposed on the brake disc by the spring varies accordingly such that the friction between the brake disc and the sleeve is changed.

15 Claims, 6 Drawing Sheets

BRAKING DEVICE FOR ROTATING SHAFT AND GEAR MOTOR SYSTEM USING THE SAME

CROSS-REFERENCE TO RELATED APPLICATIONS

This application is a continuation of International Patent Application No. PCT/CN2010/076346 with an international filing date of Aug. 25, 2010, designating the United States, now pending, and further claims priority benefits to Chinese Patent Application No. 200920193959.6 filed Sep. 1, 2009. The contents of all of the aforementioned applications, including any intervening amendments thereto, are incorporated herein by reference.

BACKGROUND OF THE INVENTION

1. Field of the Invention

The invention relates to a braking device for a rotating shaft and a gear motor system using the same.

2. Description of the Related Art

Conventionally, a gear motor is used as a driving device for opening and closing rolling doors of garages and warehouses as it has a compact structure, large torque, and slow rotational speed. To ensure such garage or warehouse doors can immediately stay at a certain position at the time of power outage or manual stop, a braking device or a brake is required to consume the inertia to prevent the doors from sliding down freely due to the gravity to ensure the personal safety. However, because conventional braking devices for gear motors employ electromagnetic braking modes, they are complicated in structure and high in costs.

SUMMARY OF THE INVENTION

In view of the above-described problems, it is one objective of the invention to provide a braking device for a rotating shaft that has a simple structure, low costs, and excellent braking performance.

Another objective of the invention is to provide a gear motor system, which has compact structure and is equipped with a breaking device with simple structure, low costs and excellent braking performance.

To achieve the above objective, in accordance with one embodiment of the invention, there is provided a braking device for a rotating shaft comprising a brake subassembly, a rotating shaft, and a sleeve, wherein the rotating shaft is sheathed with the sleeve, the brake subassembly comprises an adjustable screw, a spring, and a brake disc, one end of the spring presses on the top of the brake disc and the other end presses at the bottom of the adjustable screw; after the adjustable screw is fixed, the bottom surface of the brake disc is tightly against the outer surface of the sleeve; when the adjustable screw is adjusted, the amount of compression of the spring is changed and the pressure imposed on the brake disc by the spring varies accordingly, so that the friction between the brake disc and the sleeve is changed.

In a class of this embodiment, the sleeve is a bushing.

In a class of this embodiment, a contact surface directly formed between the brake disc and the sleeve is an arc-shaped surface.

In a class of this embodiment, the brake disc is made of carbon/carbon composition brake material.

In accordance with another embodiment of the invention, there is provided a gear motor system comprising a motor, a reduction gear assembly, a gear box, and a brake subassembly, wherein the gear box is disposed at a shaft extension end of the motor and the reduction gear assembly is disposed in the gear box; a rotating shaft in the high-speed running motor is output by a gear shaft after it is reduced by the reduction gear assembly; the rotating shaft is sheathed with a sleeve, which is attached with the rotating shaft; the brake subassembly comprises an adjustable screw, a spring, and a brake disc, and one end of the spring presses on the top of the brake disc and the other end presses at the bottom of the adjustable screw; after the adjustable screw is fixed, the bottom surface of the brake disc is tightly against the outer surface of the sleeve; when the adjustable screw is adjusted, the amount of compression of the spring is changed and the pressure imposed on the brake disc by the spring varies accordingly, so that the friction between the brake disc and the sleeve is changed.

In a class of this embodiment, the gear box is disposed with a through hole, in which the brake subassembly comprising the adjustable screw, the spring, and the brake disc is arranged. The adjustable screw is disposed at the outer end of the through hole and the brake disc extends out of the bottom of the through hole and tightly presses on the sleeve.

In a class of this embodiment, the gear box comprises a box body and a front end cover. The reduction gear assembly comprises a gear, a gear shaft, and a worm that is at the end of the rotating shaft, in which the worm engages with the gear, the gear is disposed on the gear shaft, the gear shaft is disposed in a bearing seat of the box body through bearings.

In a class of this embodiment, the sleeve is a bushing.

In a class of this embodiment, a contact surface directly formed between the brake disc and the sleeve is an arc-shaped surface.

In a class of this embodiment, the brake disc is made of carbon/carbon composition brake material.

Advantages of the invention are summarized below:
1) the mechanical braking device, which comprises an adjustable screw, a spring, and a brake disc, has a simple and compact structure, low costs, and excellent braking performance;
2) when the brake disc wears, it is possible to adjust the tightness of the adjustable screw to compress the spring so as to allow the brake disc to tightly press on the sleeve of the rotating shaft; and
3) the contact surface directly formed between the brake disc and the sleeve is designed to be an arc-shaped surface, which closely contacts with the outer surface of the sleeve. Such a structure has larger contact area and larger friction bearing area, thus the optimum braking performance can be achieved.

DETAILED DESCRIPTION OF THE EMBODIMENTS

Figure 1:
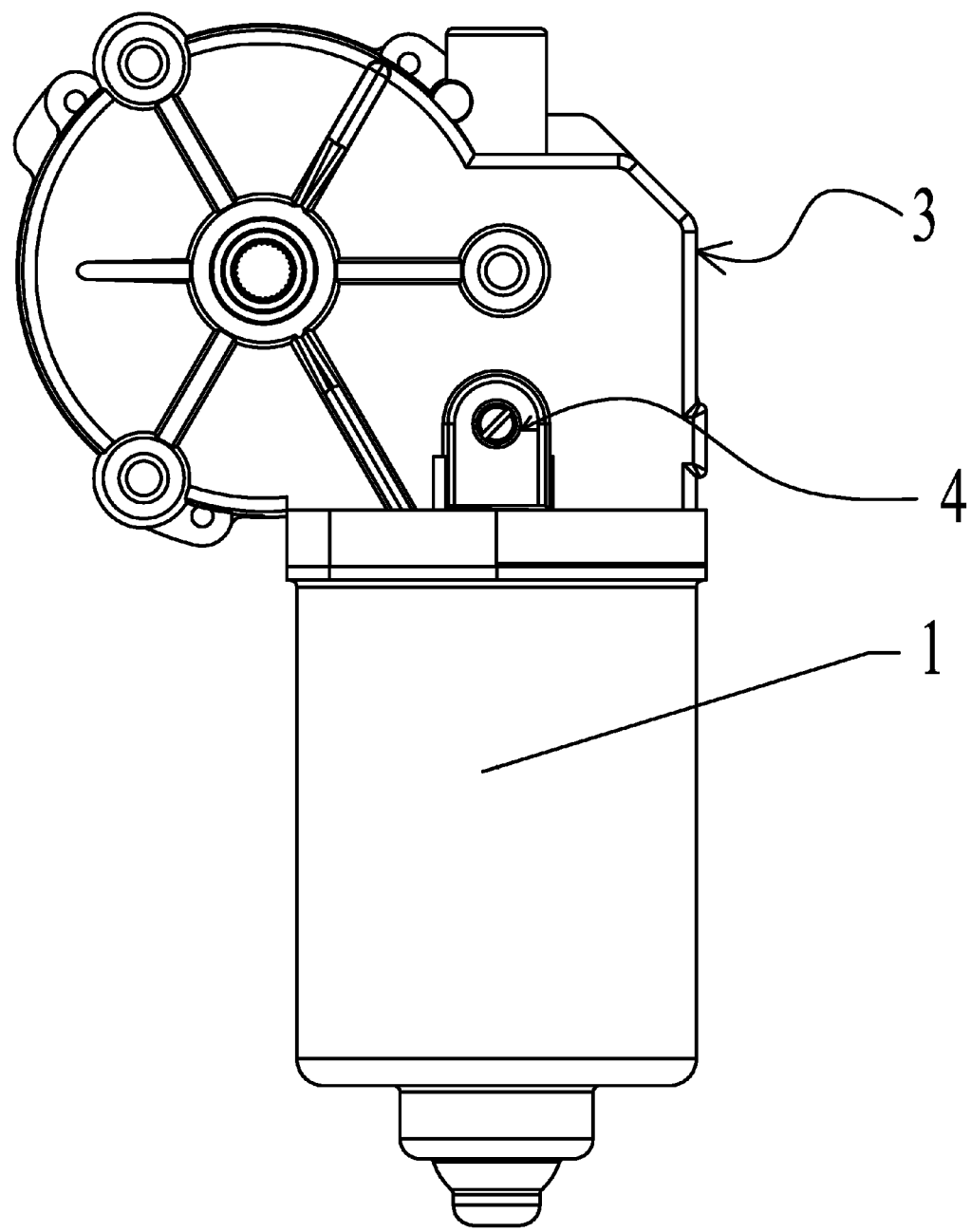
FIG. 1 is an overall structure diagram of a motor assembly in accordance with one embodiment of the invention.
Figure 2:
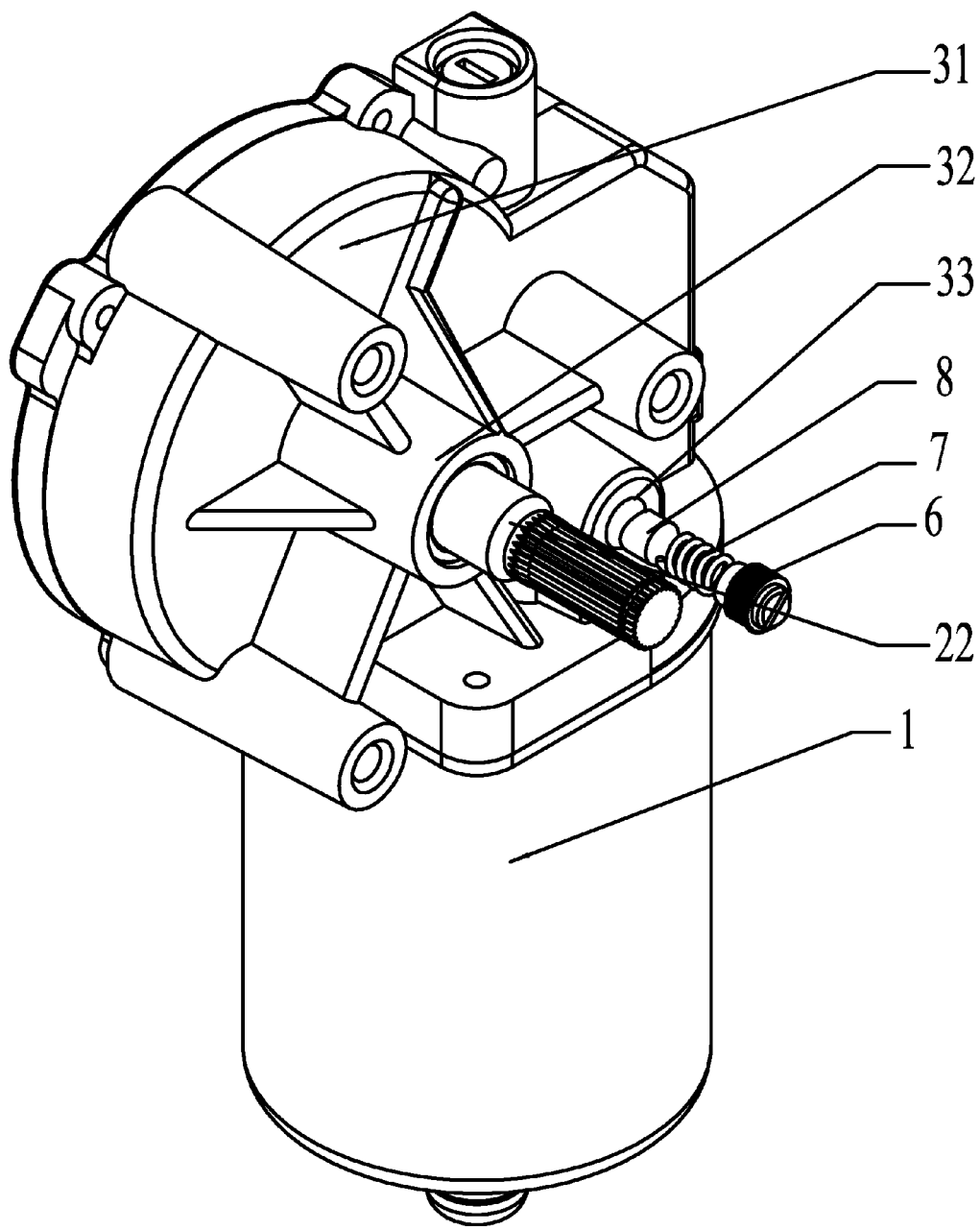
FIG. 2 is a structural representation of an exploded brake subassembly of FIG. 1.
Figure 3:
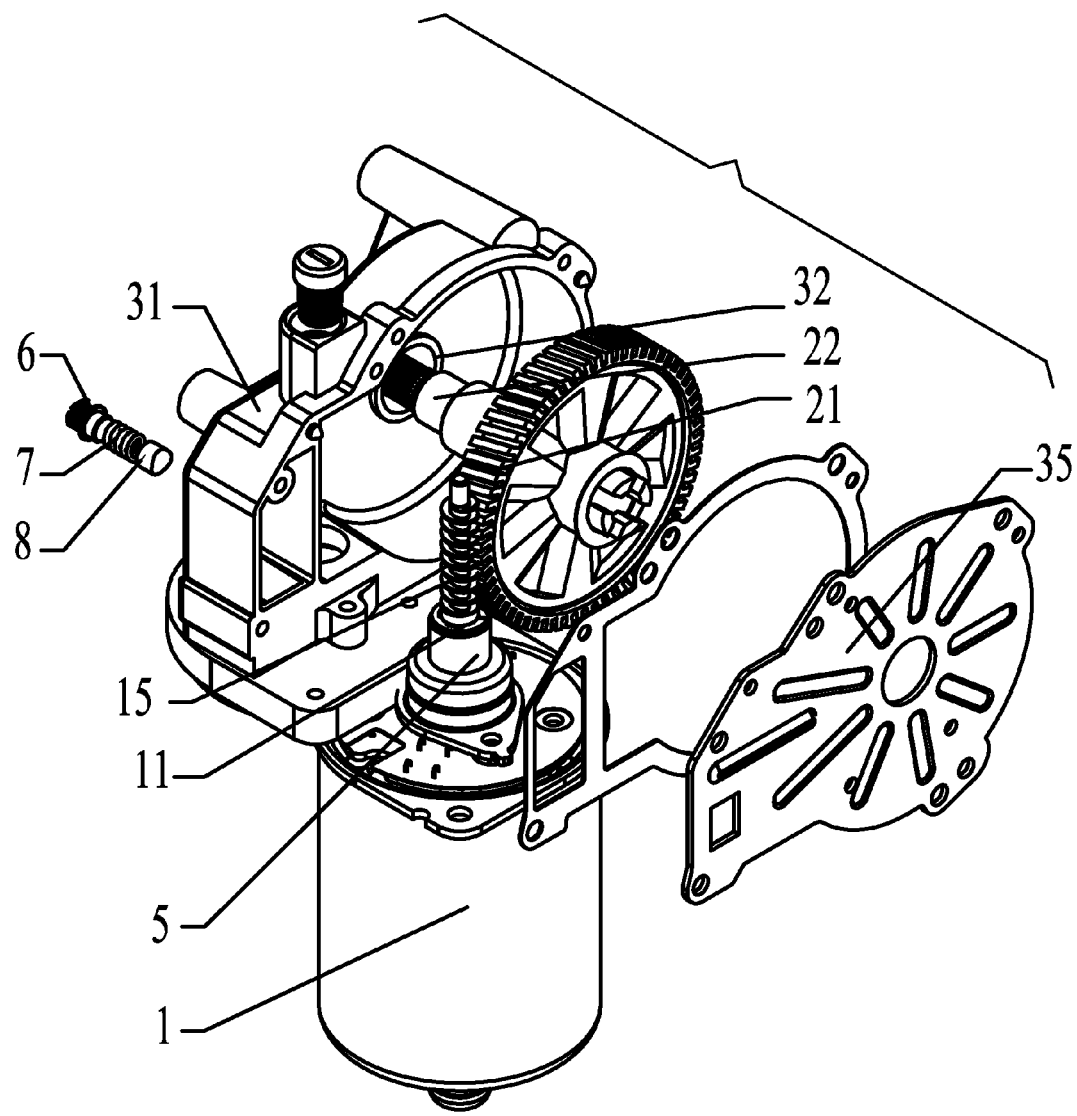
FIG. 3 is an overall exploded view of FIG. 1.
Figure 4:
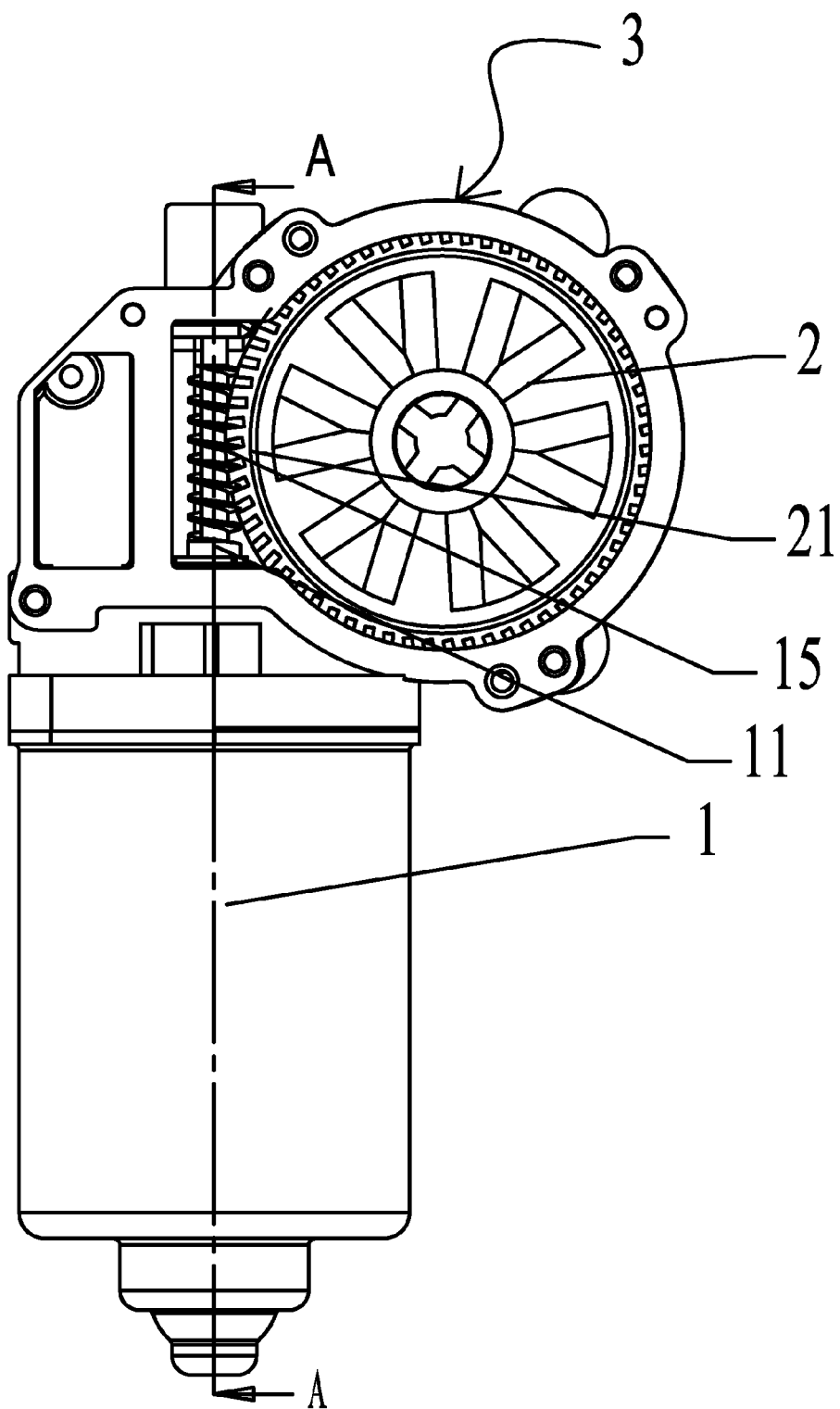
FIG. 4 is a structural representation of a gear box of the invention without gaskets and a front end cover.
Figure 5:
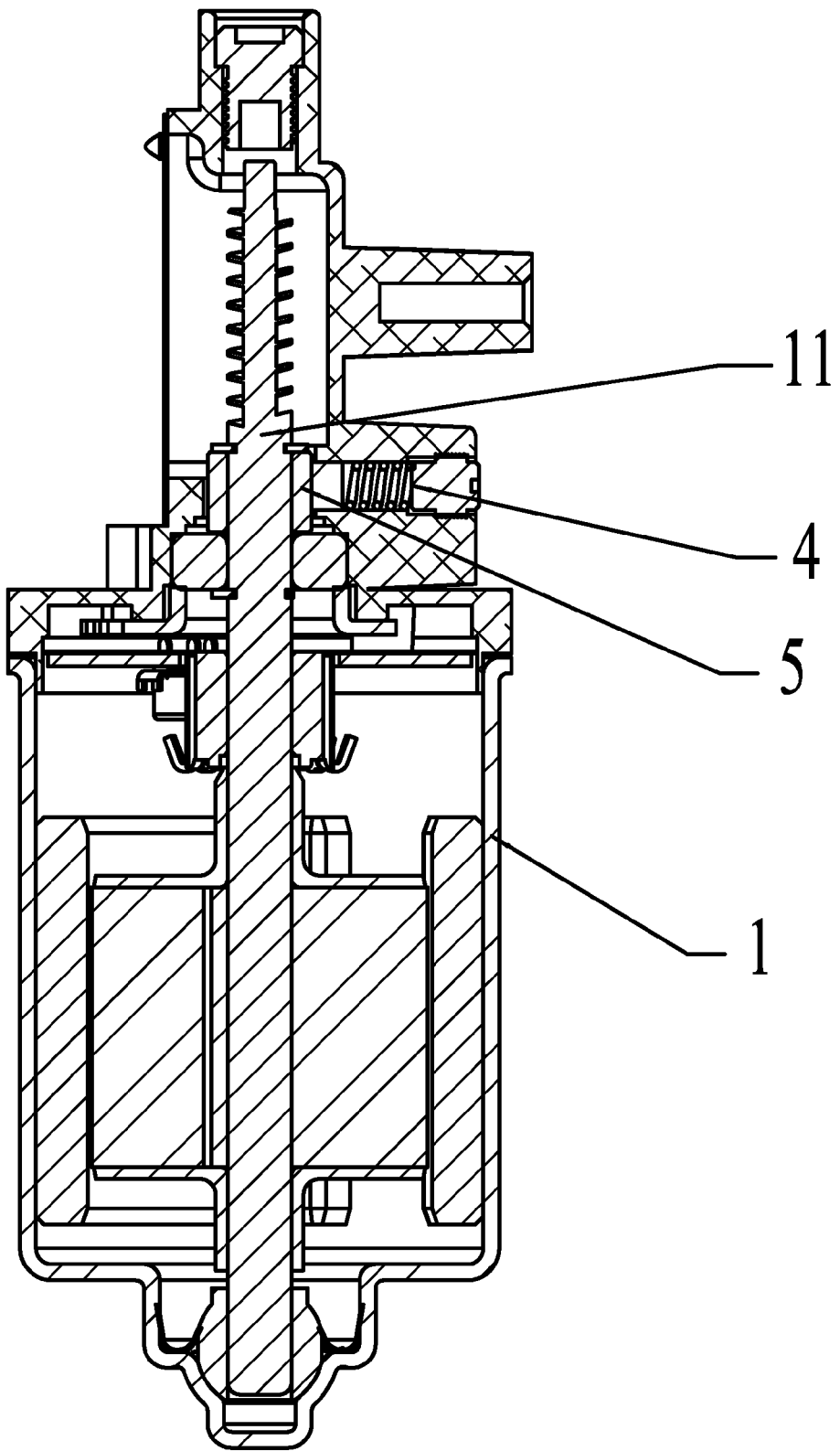
FIG. 5 is a sectional view of FIG. 4 taken from the line A-A.
Figure 6:
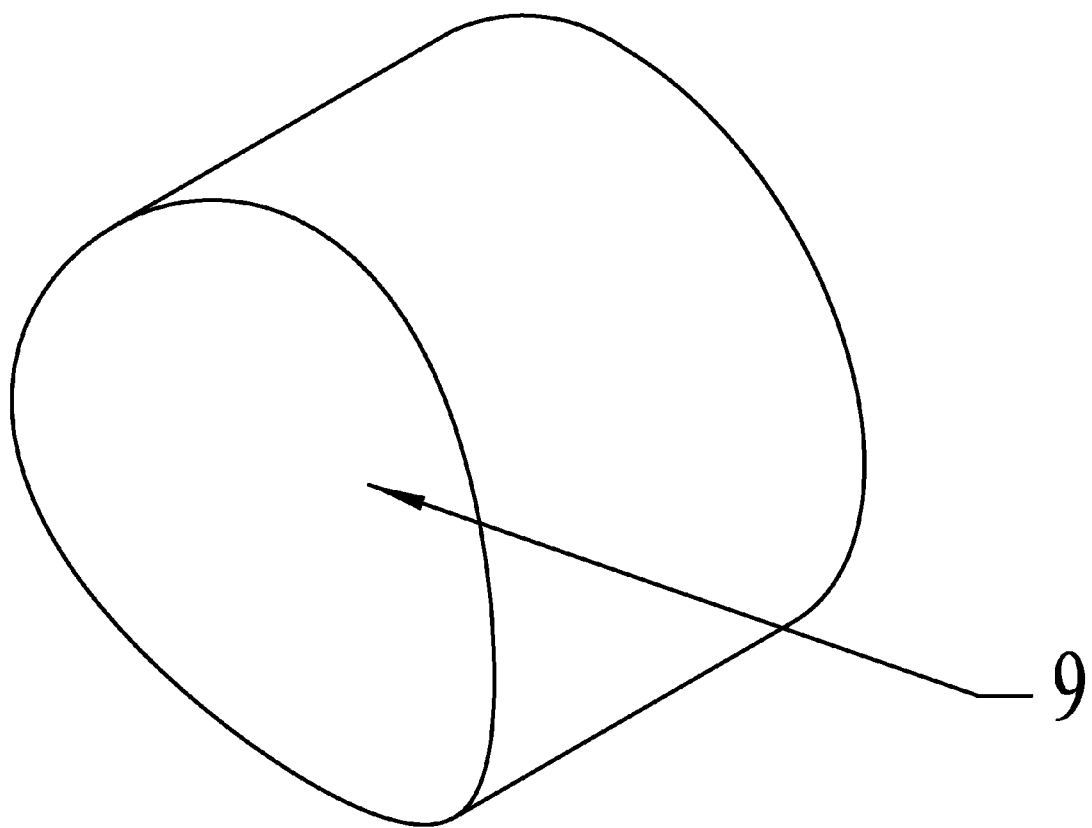
FIG. 6 is a structural representation of a brake disc in accordance with one embodiment of the invention.

As shown in FIGS. 1-6, a gear motor system, in accordance with the invention, comprises a motor 1, a reduction gear assembly 2, a gear box 3, and a brake subassembly 4. The gear box 3 is disposed at the shaft extension end of the motor and the reduction gear assembly 2 is disposed in the gear box 3. A rotating shaft 11 in the high-speed running motor 1 is output by a gear shaft 22 after it is reduced by the reduction gear assembly 2. The rotating shaft 11 is sheathed with a sleeve 5, which is attached with the rotating shaft 11. The brake subassembly 4 and the rotating shaft 11 form the braking device of the gear motor system. The brake subassembly 4 comprises an adjustable screw 6, a spring 7 and a brake disc 8, in which one end of the spring 7 presses on the top of the brake disc 8 and the other end presses at the bottom of the adjustable screw 6. After the adjustable screw 6 is fixed, the bottom surface of the brake disc 8 is tightly against the outer surface of the sleeve 5. When the adjustable screw 6 is adjusted, the amount of compression of the spring 7 can be changed and the pressure imposed on the brake disc 8 by the spring 7 varies accordingly, so that the friction between the brake disc 8 and the sleeve 5 is changed.

The gear box 3 is disposed with a through hole 33, in which the brake subassembly 4 that is composed of the adjustable screw 6, the spring 7 and the brake disc 8 is arranged. The adjustable screw 6 is disposed at the outer end of the through hole 33 and the brake disc 8 extends out of the bottom of the through hole 33 and tightly presses on the sleeve 5. The gear box 3 comprises a box body 31 and a front end cover 35. The reduction gear assembly 2 comprises a gear 21, a gear shaft 22 and a worm 15 that is at the end of the rotating shaft, in which the worm 15 engages with the gear 21, the gear 21 is disposed on the gear shaft 22, the gear shaft 22 is disposed in a bearing seat 32 of the box body 31 through bearings. The sleeve 5 can be a bushing. A contact surface 9 directly formed between the brake disc 8 and the sleeve 5 is an arc-shaped surface. The brake disc 8 is made of carbon/carbon composition brake material.

The braking device of the invention has the advantages of a simple structure, low costs, and excellent braking performance. When garage or warehouse doors tend to slide down freely due to the gravity after immediately staying at a certain position at the time of power outage or manual stop, the adjustable screw 6 can be pre-adjusted to increase the amount of compression of the spring 7, which further increases the pressure on the brake disc 8 to increase the friction between the brake disc 8 and the sleeve 5, therefore excellent mechanical brake and personal safety are achieved.

The invention claimed is:

1. A braking device for a rotating shaft, the braking device comprising:
   a) a brake subassembly; and
   b) a sleeve, the sleeve being a hollow cylinder and comprising a cylindrical outer surface;
wherein:
   the rotating shaft is sheathed with the sleeve;
   the brake subassembly comprises an adjustable screw, a spring, and a brake disc;
   one end of the spring presses on the top of the brake disc and the other end presses at the bottom of the adjustable screw;
   a bottom surface of the brake disc is a concave arc;
   the concave arc matches the cylindrical outer surface to allow the bottom surface to fit the cylindrical outer surface over an entire area of the bottom surface;
   after the adjustable screw is fixed, the bottom surface of the brake disc is tightly against the cylindrical outer surface of the sleeve to form a close contact with the cylindrical outer surface of the sleeve over the entire area of the bottom surface;
   when the adjustable screw is adjusted, the amount of compression of the spring is changed and the pressure imposed on the brake disc by the spring varies accordingly, so that the friction between the brake disc and the sleeve is changed; and
   when the bottom surface wears down due to the friction between the brake disc and the sleeve, the spring pushes the brake disc to be in the close contact with the cylindrical outer surface of the sleeve.

2. The braking device of claim 1, wherein the sleeve is a bushing.

3. The braking device of claim 1, wherein the brake disc is made of a carbon/carbon composite material.

4. The braking device of claim 2, wherein the brake disc is made of a carbon/carbon composite material.

5. A gear motor system, comprising:
   a) a motor;
   b) a reduction gear assembly;
   c) a gear box; and
   d) a brake subassembly;
wherein:
   the gear box is disposed at a shaft extension end of the motor and the reduction gear assembly is disposed in the gear box;
   the motor comprises a rotating shaft;
   the reduction gear assembly comprises a gear, a gear shaft, and a worm;
the worm is disposed at the end of the rotating shaft;
   the rotating shaft is output by the gear shaft after it is reduced by the reduction gear assembly;
   the rotating shaft is sheathed with a sleeve;
   the sleeve is a hollow cylinder and comprises a cylindrical outer surface;
   the brake subassembly comprises an adjustable screw, a spring, and a brake disc;
   one end of the spring presses on the top of the brake disc and the other end presses at the bottom of the adjustable screw;
   a bottom surface of the brake disc is a concave arc;
   the concave arc matches the cylindrical outer surface to allow the bottom surface to fit the cylindrical outer surface over an entire area of the bottom surface;
   after the adjustable screw is fixed, the bottom surface of the brake disc is tightly against the cylindrical outer surface of the sleeve to form a close contact with the cylindrical outer surface of the sleeve;
   when the adjustable screw is adjusted, the amount of compression of the spring is changed and the pressure imposed on the brake disc by the spring varies accordingly, so that the friction between the brake disc and the sleeve is changed; and
   when the bottom surface wears down due to the friction between the brake disc and the sleeve, the spring pushes the brake disc to be in the close contact with the cylindrical outer surface of the sleeve over the entire area of the bottom surface.

6. The gear motor system of claim 5, wherein
   the gear box is disposed with a through hole, in which the brake subassembly comprising the adjustable screw, the spring, and the brake disc is arranged; and
   the adjustable screw is disposed at the outer end of the through hole and the brake disc extends out of the bottom of the through hole and presses on the sleeve.

7. The gear motor system of claim 5, wherein
   the gear box comprises a box body and a front end cover;
   the worm engages with the gear;
   the gear is disposed on the gear shaft; and the gear shaft is disposed in a bearing seat of the box body through bearings.

8. The gear motor system of claim 6, wherein
the gear box comprises a box body and a front end cover;
the worm engages with the gear;
the gear is disposed on the gear shaft; and
the gear shaft is disposed in a bearing seat of the box body through bearings.

9. The gear motor system of claim 7, wherein the sleeve is a bushing.

10. The gear motor system of claim 8, wherein the sleeve is a bushing.

11. The gear motor system of claim 5, wherein the brake disc is made of a carbon/carbon composite material.

12. The gear motor system of claim 6, wherein the brake disc is made of a carbon/carbon composite material.

13. A gear motor system, comprising:
a) a motor, the motor comprising a rotating shaft and a shaft extension end;
b) a reduction gear assembly, the reduction gear assembly comprising a gear, a gear shaft, and a worm;
c) a gear box;
d) a brake subassembly, the brake subassembly comprising an adjustable screw, a spring, and a brake disc; the spring comprising a first end and a second end; the brake disc comprising a bottom face and a top face; and
e) a sleeve, the sleeve being a cylinder and comprising a cylindrical outer surface and a sleeve cavity;
wherein:
the gear box is disposed on the shaft extension end;
the reduction gear assembly is disposed in the gear box;
the worm is fixedly connected to the rotating shaft;
the worm is engaged with the gear;
the gear is fixedly connected to the gear shaft;
the rotating shaft is fixedly disposed in the sleeve cavity to allow the sleeve to rotate in company with the rotating shaft;
the bottom face is a concave arc;
the concave arc matches the cylindrical outer surface;
the first end of the spring is disposed on the top surface and the second end is disposed on the adjustable screw to force the spring into a compressed state to press the brake disc into a close contact with the cylindrical outer surface over an entire surface of the bottom surface; and
when the bottom surface wears down due to the friction between the brake disc and the sleeve, the spring pushes the brake disc to be in the close contact with the cylindrical outer surface of the sleeve over the entire area of the bottom surface.

14. A method of utilizing the gear motor system of claim 13, the method comprising: turning the adjustable screw to adjust the spring to allow the rotating shaft to overcome friction between the sleeve and the brake disc to rotate when the motor is on and to allow the friction between the sleeve and the brake disc to prevent the rotating shaft from rotating when the motor is off.

15. The gear motor system of claim 13, wherein the brake disc is made of a carbon/carbon composite material.

\* \* \* \* \*